(12) United States Patent
Lee et al.

(10) Patent No.: US 8,861,321 B2
(45) Date of Patent: Oct. 14, 2014

(54) METHOD AND APPARATUS FOR GENERATING TRACKING ERROR SIGNAL AND OPTICAL INFORMATION STORAGE SYSTEM INCLUDING THE APPARATUS

(71) Applicant: Toshiba Samsung Storage Technology Korea Corporation, Suwon-si (KR)

(72) Inventors: Dong-han Lee, Suwon-si (KR); Young-ok Koh, Yongin-si (KR); Sang-chul Kim, Suwon-si (KR); Hong-kyung Lee, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/895,422

(22) Filed: May 16, 2013

(65) Prior Publication Data

US 2013/0308432 A1    Nov. 21, 2013

(30) Foreign Application Priority Data

May 16, 2012    (KR) ........................ 10-2012-0052207

(51) Int. Cl.
    *G11B 7/00*    (2006.01)
    *G11B 7/09*    (2006.01)
(52) U.S. Cl.
    CPC ............ *G11B 7/0941* (2013.01); *G11B 7/0901* (2013.01); *G11B 7/094* (2013.01)
    USPC .................................... 369/44.35
(58) Field of Classification Search
    None
    See application file for complete search history.

(56) References Cited

U.S. PATENT DOCUMENTS

| | | | |
|---|---|---|---|
| 6,407,967 B1* | 6/2002 | Odajima et al. | 369/44.23 |
| 7,385,888 B2* | 6/2008 | Stallinga et al. | 369/44.41 |
| 7,693,011 B2* | 4/2010 | Cheng et al. | 369/44.13 |
| 8,018,814 B2* | 9/2011 | Ogasawara et al. | 369/112.02 |
| 2003/0137907 A1* | 7/2003 | Kitayama et al. | 369/44.32 |
| 2003/0179666 A1* | 9/2003 | Kakitsuka et al. | 369/44.34 |
| 2006/0181996 A1 | 8/2006 | Matsumiya et al. | |
| 2008/0101172 A1* | 5/2008 | Kubota | 369/44.26 |
| 2009/0097366 A1* | 4/2009 | Yamamuro | 369/44.32 |
| 2013/0308432 A1* | 11/2013 | Lee et al. | 369/44.35 |

FOREIGN PATENT DOCUMENTS

| | | |
|---|---|---|
| JP | 11-149646 | 6/1999 |
| JP | 11-353670 | 12/1999 |
| JP | 2004-192776 | 7/2004 |
| JP | 2007-042249 | 2/2007 |
| KR | 10-2002-0096642 A | 12/2002 |

OTHER PUBLICATIONS

Korean Office Action issued Jun. 5, 2013 in counterpart Korean Patent Application No. 10-2012-0052207 (3 pages, in Korean).

* cited by examiner

*Primary Examiner* — Peter Vincent Agustin
(74) *Attorney, Agent, or Firm* — NSIP Law

(57) ABSTRACT

Provided are an apparatus and method of generating a tracking error signal, and an optical information storage system including the apparatus. The apparatus includes a bias signal generator for generating a bias signal for canceling a direct current (DC) offset of a push-pull signal using a tracking control signal generated by the tracking controller. Accordingly, an offset generated in a tracking error signal may be canceled or otherwise reduced using the bias single instead of using an additional side beam.

18 Claims, 8 Drawing Sheets

METHOD AND APPARATUS FOR GENERATING TRACKING ERROR SIGNAL AND OPTICAL INFORMATION STORAGE SYSTEM INCLUDING THE APPARATUS

CROSS-REFERENCE TO RELATED APPLICATION(S)

This application claims the benefit under 35 USC §119 of Korean Patent Application No. 10-2012-0052207, filed on May 16, 2012, in the Korean Intellectual Property Office, the entire disclosure of which is incorporated herein by reference for all purposes.

BACKGROUND

1. Field

The following description relates to a method and apparatus for generating a tracking error signal without using a side beam.

2. Description of Related Art

There are various methods for generating a tracking error signal from an optical disc. In a push-pull (PP) method, an offset is generated according to a lens shift. In order to cancel the offset, a differential PP (DPP) method is used and is based on a side beam. The DPP method cancels an offset generated by a shift of the tracking error signal according to a lens shift, by amplifying a side beam PP (SPP) and generating a direct current (DC) offset that has the same size and an opposite phase from a main beam PP (MPP).

When the DPP method is applied, an optical pickup splits light emitted from a light source into three beams, for example, a main beam and two side beams, using a grating. In this example, a photodetector may be used to generate a PP signal by detecting the main beam and the two side beams irradiated on and reflected from an optical disc.

As such, in order to use the DPP method, an optical structure and a circuit structure, which are configured to generate and detect a side beam, are required. However, the generation of the side beam typically deteriorates the power of the main beam used to record/reproduce on/from the optical disc. As a result, the DPP method causes additional power consumption while reducing the quality of the main beam.

SUMMARY

In an aspect, there is provided an apparatus for generating a tracking error signal, the apparatus including a tracking controller configured to generate a tracking control signal to tracking-control an optical pickup, a bias signal generator configured to generate a bias signal to be used to cancel a direct current (DC) offset of a push-pull signal, the bias signal being generated based on the tracking control signal generated by the tracking controller, and an adder configured to add the push-pull signal and the bias signal to generate a tracking error signal from which the DC offset is removed.

The bias signal generator may comprises a shift amount monitor configured to monitor a shift amount of the tracking control signal, and a bias calculator configured to calculate and output a bias value to be compensated for according to the shift amount of the tracking control signal.

The apparatus may further comprise a compensator configured to process a shift signal monitored by the shift amount monitor and input the processed shift signal to the bias calculator.

The compensator may comprise a high-pass filter, a gain adjustor, and a low-pass filter.

A cut-off frequency of the high-pass filter may be adjustable.

The tracking error signal output from the adder may be fed back to the tracking controller.

In an aspect, there is provide an optical information storage system including an optical pickup comprising a detector to detect light reflected from an optical information storage medium, a push-pull signal detector for generating a push-pull signal from a signal detected by the photodetector, and an apparatus for generating a tracking error signal, the apparatus comprising a tracking controller configured to generate a tracking control signal to tracking-control an actuator of the optical pickup, a bias signal generator configured to generate a bias signal to be used to cancel a direct current (DC) offset of a push-pull signal, the bias signal being generated based on the tracking control signal generated by the tracking controller, and an adder configured to add the push-pull signal and the bias signal to generate a tracking error signal from which the DC offset is removed by adding the push-pull signal and the bias signal.

The bias signal generator may comprise a shift amount monitor configured to monitor a shift amount of the tracking control signal, and a bias calculator configured to calculate and output a bias value to be compensated for according to the shift amount of the tracking control signal.

The optical information storage system may further comprise a compensator configured to process a shift signal monitored by the shift amount monitor and input the processed shift signal to the bias calculator.

The compensator may comprise a high-pass filter, a gain adjustor, and a low-pass filter.

A cut-off frequency of the high-pass filter may be adjustable.

The optical pickup may be configured to irradiate light emitted from a light source to the optical information storage medium in a single light form.

The photodetector may comprise a quadrant photodetector.

The tracking error signal output from the adder may be fed back to the tracking controller.

In an aspect, there is provided a method of generating a tracking error signal, the method including generating a tracking control signal used for tracking-control, generating a bias signal to cancel a direct current (DC) offset of a push-pull signal, the bias signal being generated based on the generated tracking control signal, and adding the push-pull signal and the bias signal to generate a tracking error signal from which the DC offset is canceled.

The generating of the bias signal may comprise monitoring a shift amount of the tracking control signal, and calculating and outputting a bias value to be compensated for according to the shift amount of the tracking control signal.

The method may further comprise processing a monitored shift signal.

The processing of the monitored shift signal may comprise high-pass filtering the monitored shift signal, adjusting a gain of the high-pass filtered shift signal, and low-pass filtering the gain-adjusted shift signal.

A cut-off frequency of the shift signal that is high-pass filtered may be adjustable.

The tracking error signal from which the DC offset is canceled may be fed back to be used to generate the tracking control signal.

Other features and aspects may be apparent from the following detailed description, the drawings, and the claims.

Figure 1:
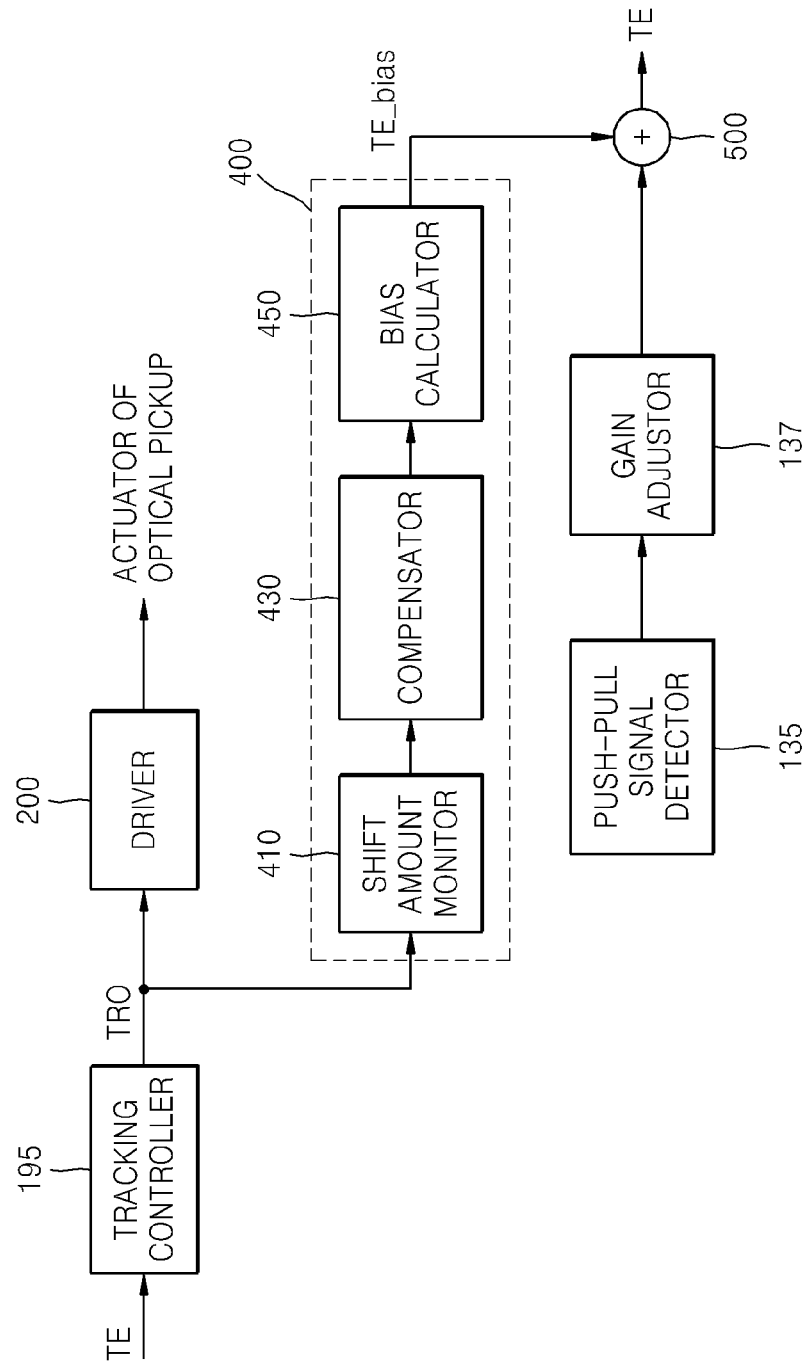
FIG. 1 is a diagram illustrating an example of an apparatus for generating a tracking error signal.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
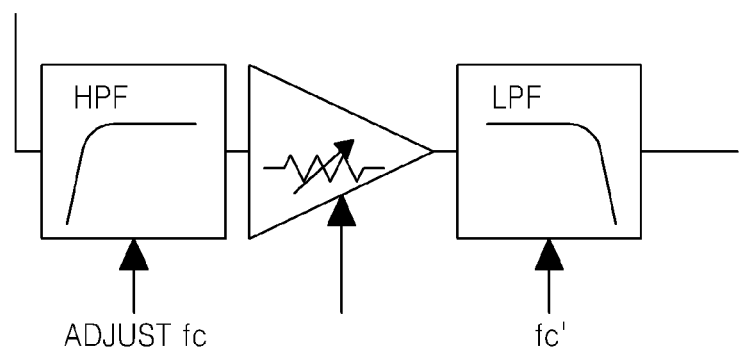
FIG. 2 is a diagram illustrating an example of a compensator of FIG. 1.

FIG. 1 illustrates an example of an apparatus for generating a tracking error signal, and FIG. 2 illustrates an example of a compensator 430 of FIG. 1.

Referring to FIG. 1, the apparatus includes a tracking controller 195, a bias signal generator 400, and an adder 500. The tracking controller 195 generates a tracking control signal (a tracking output (TRO)) that may be used to tracking-control an optical pickup. In this example, the tracking control signal generated by the tracking controller 195 is input to a driver 200 and may be used to tracking-drive an actuator of the optical pickup.

Figure 6:
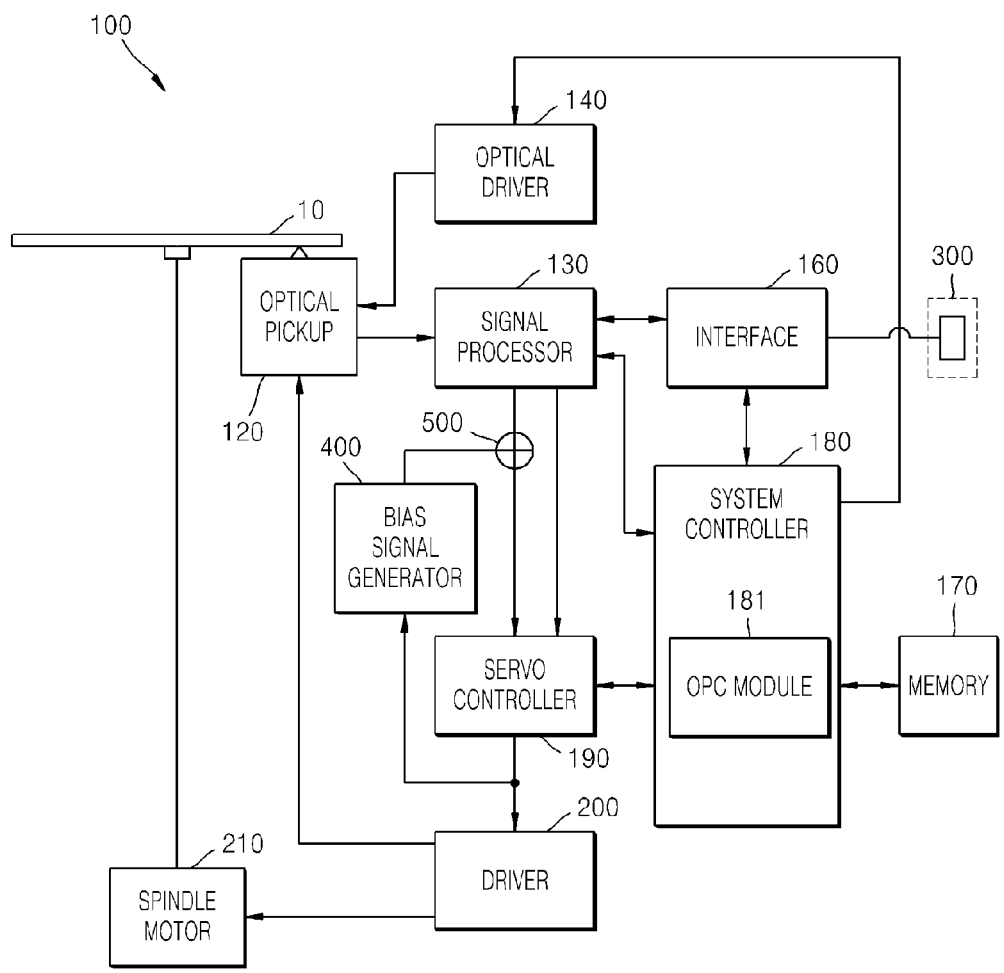
FIG. 6 is a diagram illustrating an example of an optical information storage system including the apparatus of FIG. 1.

The tracking controller 195 may be included in a servo controller 190 of an optical information storage system 100 as shown in the example of FIG. 6. The tracking error signal has a sine waveform while a tracking servo is not operated. While the tracking servo is operated, the driver 200 is driven using the tracking control signal to tracking-control the actuator of the optical pickup, and thus the tracking error signal has a flat form. When a direct current (DC) offset according to a lens shift is not canceled, a center point of an amplitude of the tracking error signal is away from a reference level Vref by the DC offset.

The bias signal generator 400 generates a bias signal that may be used to cancel the DC offset generated in the tracking error signal without using a side beam. According to various aspects, the bias signal is generated using the tracking control signal.

The bias signal generator 400 may include a shift amount monitor 410 for monitoring a shift amount of the tracking control signal, and a bias calculator 450 for calculating and outputting a bias value to be compensated for according to the shift amount of the tracking control signal. The bias signal generator 400 may further include the compensator 430 for processing a shift signal that is monitored by the shift amount monitor 410 and for inputting the processed shift signal to the bias calculator 450.

The shift amount monitor 410 calculates the shift amount of the tracking control signal. For example, the shift amount of the tracking control signal may correspond to the amplitude of the tracking control signal.

The compensator 430 may determine a cut-off frequency, a phase, and/or a gain of the tracking control signal. For example, the compensator 430 may include, as shown in FIG. 2, a high-pass filter HPF, a gain adjustor, and a low-pass filter LPF, which may be used to adjust a phase margin or a gain margin. In FIG. 2, fc denotes a cut-off frequency of the high-pass filter HPF and fc' denotes a cut-off frequency of the low-pass filter LPF. Because a required frequency differs according to a disk access time of an optical information storage system, the high-pass filter HPF may be configured such that the cut-off frequency fc may be adjustable.

The bias calculator 450 calculates the bias value that is to be compensated for by calculating a correlation amount between the shift of the tracking control signal and an offset of the tracking error signal.

The adder 500 outputs the tracking error signal from which the DC offset is canceled or otherwise reduced by adding a push-pull signal generated by a push-pull signal detector 135 and a bias signal TE bias output from the bias signal generator 400. The tracking error signal output from the adder 500 is fed back to the tracking controller 195 and may be used to generate the tracking control signal for tracking-controlling the actuator of the optical pickup.

As an example, the push-pull signal detector 135 may be included in a signal processor 130 or an optical pickup 120 of the optical information storage system 100 of FIG. 6. In FIG. 1, the push-pull signal generated by the push-pull signal detector 135 is gain-adjusted by a gain adjustor 137 and then input to the adder 500. As another example, the gain adjustor 137 may be omitted or included in the push-pull signal detector 135. For example, the gain adjustor 137 may be included in the signal processor 130 or the optical pickup 120 of the optical information storage system 100 of FIG. 6, like the push-pull signal detector 135.

According to various aspects, due to the bias signal generator 400 described above, an offset generated in the tracking error signal may be canceled or otherwise reduced without using a side beam.

In general, a DC offset is generated in a signal that is detected using a push-pull method, i.e., in the push-pull signal, according to a lens shift. In a general differential push-pull method, a side beam push-pull (SPP) signal is amplified to a DC offset having a same size and an opposite phase as a main beam push-pull (MPP) signal, to thereby cancel an offset generated by a shift of the tracking error signal according to the lens shift. When the differential push-pull method is used, an optical pickup splits light emitted from a light source into three beams, i.e., one main beam and two side beams, using a grating, and uses a photodetector to detect the main beam and the two side beams irradiated to and reflected from an optical information storage medium to generate a differential push-pull signal.

According to various aspects, when a side beam is not used to generate the tracking error signal, the grating for splitting the light emitted from the light source into three beams is not needed. Accordingly, the optical pickup may irradiate the light emitted from the light source onto the optical information storage medium in a single light form, and the photodetector may only receive a single light beam corresponding to the main beam. Thus, a quadrant photodetector may be applied.

Figure 3:
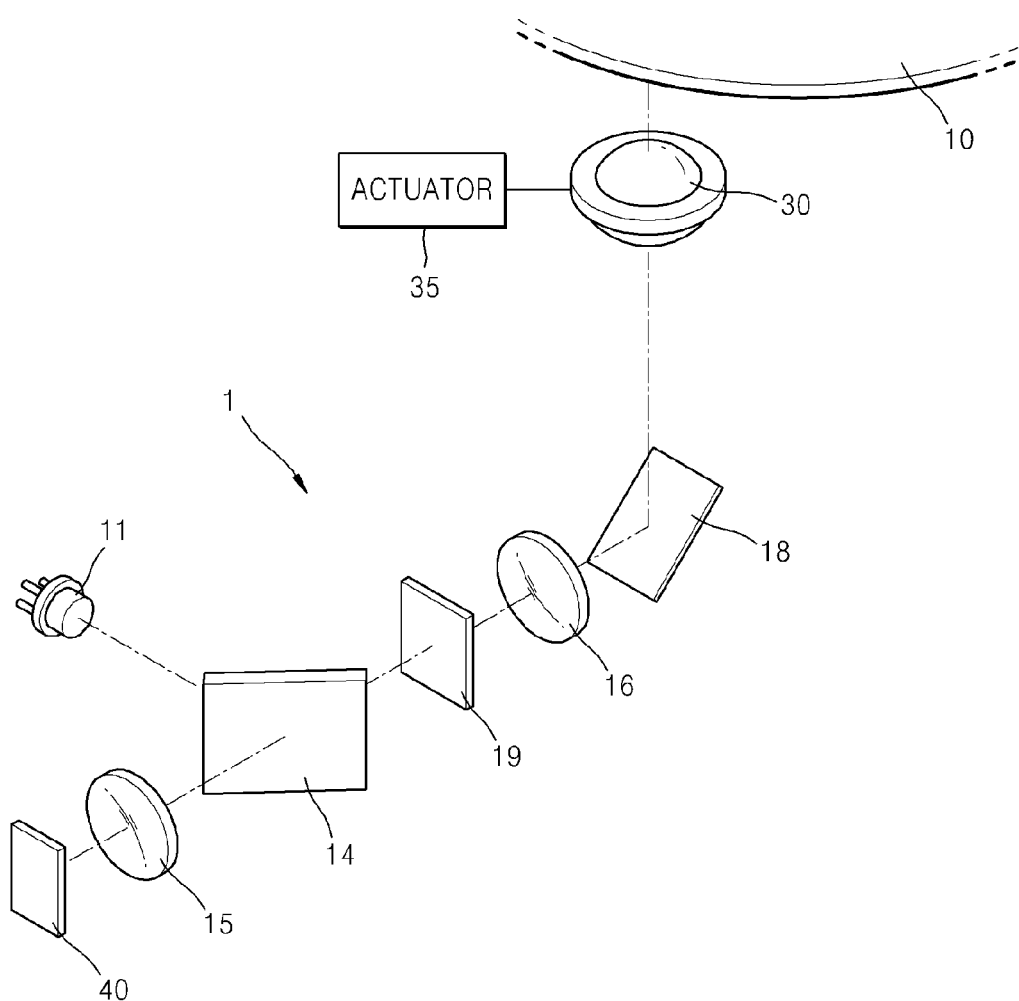
FIG. 3 is a diagram illustrating an example of an optical pickup applicable to an optical information storage system including an apparatus for generating a tracking error signal.
Figure 4:
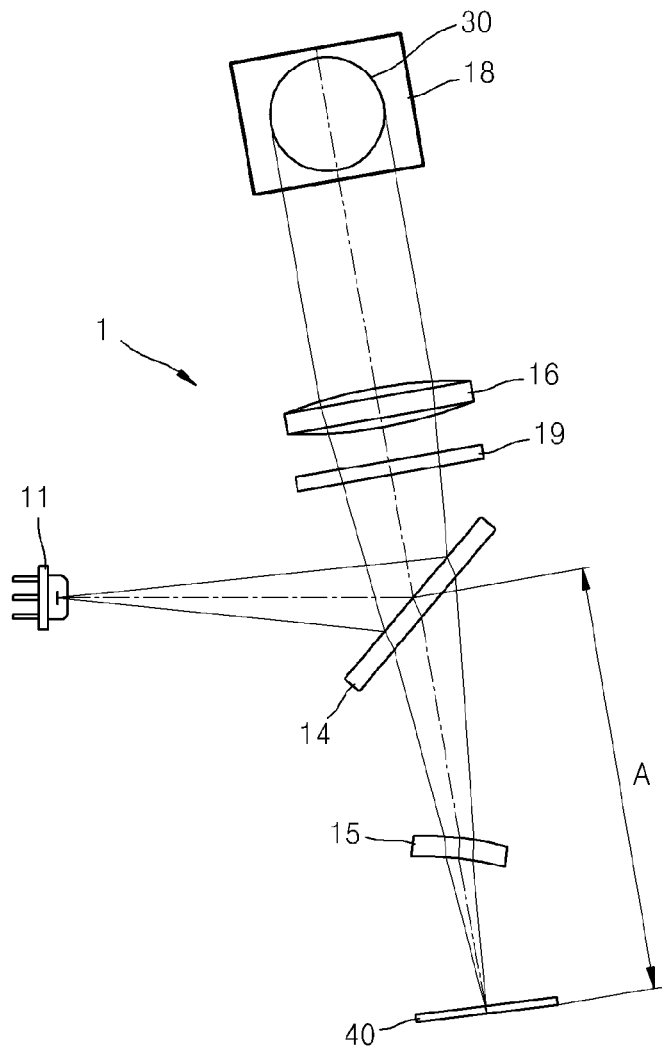
FIG. 4 is a diagram illustrating an example of the optical pickup.
Figure 5:
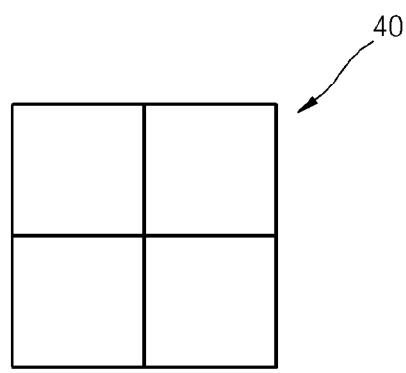
FIG. 5 is a diagram illustrating an example of a photodetector.

FIGS. 3 and 4 illustrate examples of an optical configuration of an optical pickup 1 applicable to an optical information storage system including an apparatus for generating a tracking error signal, and FIG. 5 illustrates an example of a photodetector 40 of FIGS. 3 and 4.

Referring to FIGS. 3 and 4, the optical pickup 1 includes a light source 11, an objective lens 30 that forms a light spot on an optical information storage medium 10 by focusing incident light, a collimating lens 16 collimating light that is emitted from the light source 11 to be incident on the objective lens 30, an optical path changer 14 converting a path of an incident light beam, a photodetector 40 detecting an information signal and/or an error signal based on light reflected from the optical information storage medium 10, and a detection lens 15 enabling a light reflected from the optical information storage medium 10 to be received by the photodetector 40. The collimating lens 16 may be disposed between the objective lens 30 and the optical path changer.

For example, the light source 11 may be a single light source, a twin light source emitting lights of two different wavelengths, and the like. The objective lens 30 focuses the light emitted from the light source 11 on the optical information storage medium 10. The objective lens 30 is driven in a focusing and tracking direction by an actuator 35. The tracking control signal generated by the tracking controller 195 of the apparatus described above with reference to FIGS. 1 and 2 may be applied to the actuator 35 through the driver 200 to tracking-drive the objective lens 30. The collimating lens 16 collimates the light emitted from the light source 11 to be incident on the objective lens 30.

The optical path changer 14 directs the light incident from the light source 11 towards the objective lens 30 and directs the light reflected from the optical information storage medium 10 towards the photodetector 40. For example, the optical path changer 14 may include a polarization dependent optical path changer, for example, a polarization beam splitter for converting a path of an incident light according to polarization. A quarter-wave plate 19 for changing polarization of the incident light may be further disposed on an optical path between the polarization beam splitter 14 and the objective lens 30. In FIGS. 3 and 4, the quarter-wave plate 19 is disposed between the polarization beam splitter 14 and the collimating lens 16. As another example, the quarter-wave plate 19 may be disposed between the collimating lens 16 and the objective lens 30.

When the polarization beam splitter 14 and the quarter-wave plate 19 are used, a linearly polarized light, for example, p-polarized light, incident from the light source 11 on the polarization beam splitter 14 may be reflected by a mirror surface of the polarization beam splitter 14. The reflected light may proceed towards the optical information storage medium 10 after being changed to a circularly polarized light via the quarter-wave plate 19. The circularly polarized light is changed to other circularly polarized light through reflection by the optical information storage medium 10 and is then changed to other linearly polarized light, for example, s-polarized light, via the quarter-wave plate 19. The other linearly polarized light is directed towards the photodetector 40 by passing through the mirror surface of the polarization beam splitter 14.

Here, the polarization dependent optical path changer may include, for example, a polarization hologram device configured to pass light of a polarization emitted from the light source 11 and diffract a light of another polarization reflected from the optical information storage medium 10 into +1th-order or −1th-order. When the polarization dependent optical path changer includes the polarization hologram device, the light source 11 and the photodetector 40 may be optically modularized.

As another example, instead of the polarization dependent optical path changer, the optical path changer may include a beam splitter passing and reflecting an incident light at a predetermined rate, or a hologram device passing the light emitted from the light source 11 and diffracting a light reflected from the optical information storage medium 10 into +1th-order or −1th-order. When the optical path changer includes a hologram device, the light source 11 and the photodetector 40 may be optically modularized.

In FIGS. 3 and 4, the optical pickup 1 further includes a reflection mirror for changing an optical path.

The detection lens 15 enables a light reflected by the optical information storage medium 10 and passing through the objective lens 30 and the collimating lens 16, to be received by the photodetector 40. For example, the detection lens 15 may be an astigmatic lens generating an astigmatism so that a focus error signal is detected via an astigmatic method. As shown in FIG. 5, the photodetector 40 may be a quadrant photodetector.

It should be appreciated that the optical pickup for generating a tracking error signal, as described herein, is not limited to the optical pickup 1 of FIGS. 3 through 5. For example, the optical pickup 1 may further include a grating (not shown) for splitting the light emitted from the light source 11 into three light beams. As another example, the photodetector 40 may further include a halved or quadrant sub photodetector for detecting two sub beams in addition to a quadrant main photodetector for detecting a main beam. According to various aspects, an offset generated in the tracking error signal may be canceled without using a side beam, while generating the tracking error signal.

Hereinafter, examples of an optical information storage system including an apparatus for generating a tracking error signal are described.

The optical information storage system may include an optical pickup, a push-pull signal detector, and the apparatus. As described above, the push-pull signal detector may be included in the signal processor 130 or the optical pickup 120 of FIG. 6, and a tracking controller 195 of the apparatus may be included in the servo controller 190 of FIG. 6.

FIG. 6 illustrates an example of an optical information storage system 100 including the apparatus of FIG. 1.

Referring to FIGS. 1 and 6, the optical information storage system 100 includes the optical information storage medium 10, the optical pickup 120, the signal processor 130, an optical driver 140, a system controller 180, a memory 170, the bias signal generator 400, the adder 500, the servo controller 190, the driver 200, and a spindle motor 210. As an example, the optical information storage system 100 may be an optical disc drive that is included in a game console, a Blu-ray player, a CD/DVD player, and the like. Accordingly, the optical information storage medium 10 may be a compact disc (CD), a digital versatile disc (DVD), a blue-ray disc (BD), and the like.

The optical pickup 120 focuses an optical signal on the optical information storage medium 10 based on an optical drive signal generated by the optical driver 140, and detects the optical signal reflected from the optical information storage medium 10, thereby reproducing or recording information on the optical information storage medium 10. The optical pickup 120 may have the optical configuration described above with reference to FIGS. 3 through 5, or any one of various other optical configurations.

The signal processor 130 generates a focus error signal, a tracking error signal (push-pull signal), and an information reproduction signal by combining signals detected by the optical pickup 120.

The optical driver 140 outputs a record pulse that may be used to determine an optimum power control (OPC) process for adjusting a writing power value in a record mode, and may output the optical drive signal for generating reproduction power at a constant level in a reproduction mode.

The servo controller 190 generates an actuator drive voltage for controlling the optical pickup 120 using the tracking error signal and the focus error signal, and generates a drive voltage of a sled motor (not shown) for moving the optical pickup 120 to a target track. Also, the servo controller 190 generates a control signal of the spindle motor 210 to control a rotational speed of the optical information storage medium 10.

As described above with reference to FIG. 1, the bias signal generator 400 generates the bias signal for canceling or otherwise reducing the DC offset of the tracking error signal using a tracking control signal generated by the tracking controller 195 of the servo controller 190.

The adder 500 is disposed between a push-pull signal output terminal of the signal processor 130 and the tracking controller 195 of the servo controller 190. The adder may add the bias signal to the push-pull signal, and output the tracking error signal obtained by removing the DC offset from the push-pull signal to the servo controller 190.

The driver 200 generates a drive current for driving the spindle motor 210 and the sled motor according to a control signal generated by the servo controller 190. The driver 200 generates an actuator drive current of the optical pickup 120 for controlling focusing and tracking.

The system controller 180 includes the signal processor 130 and the servo controller 190 to control the optical information storage system 100, and determine a type and intrinsic information of the optical information storage medium 10 to be recorded or reproduced.

The memory 170 may store the write power value or information related to a write strategy. For example, the memory 170 may be a nonvolatile memory such as a flash memory, and the like.

The optical information storage system 100 may further include an interface 160 for receiving and transmitting information with a host. The interface 160 may be controlled by the system controller 180. The interface 160 may be configured via any one of various standards, for example, a universal serial bus (USB) port. Accordingly, the interface 160 may be used to connect the optical information storage system 100 to a host, such as a computer 300, according to a USB protocol to transmit and receive information.

Figure 7:
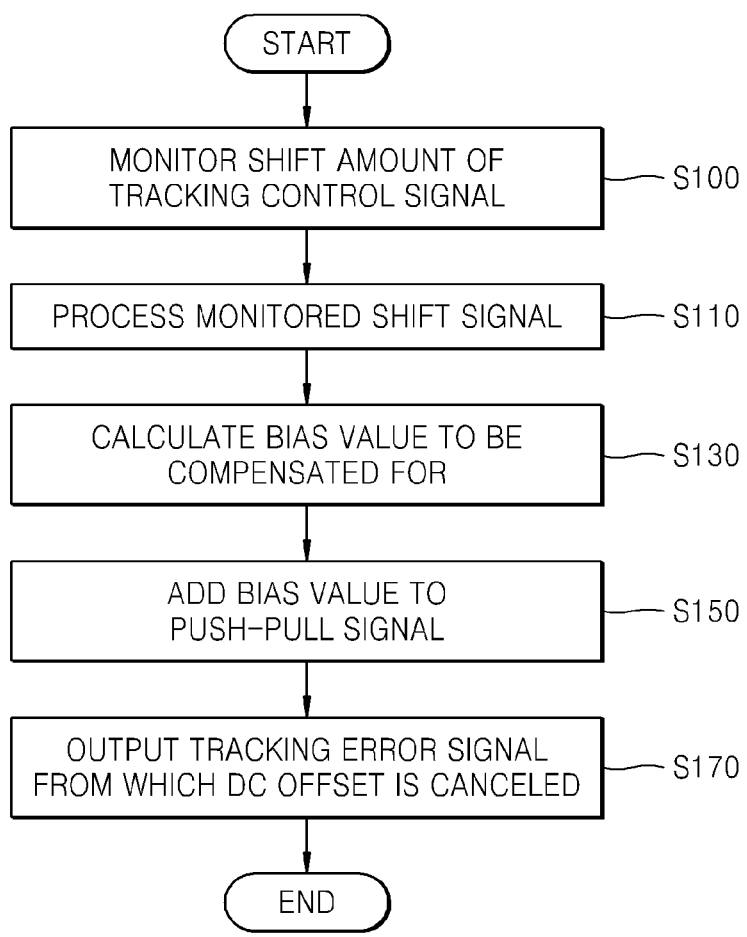
FIG. 7 is a diagram illustrating an example of a method of generating a tracking error signal.

FIG. 7 illustrates an example of a method of generating a tracking error signal. Referring to FIGS. 1 and 7, the bias signal for canceling the DC offset of the push-pull signal is generated by using the tracking control signal generated by the tracking controller 195 in operations 100, 110, and 130.

In order to generate the bias signal, first, the shift amount monitor 410 monitors the shift amount of the tracking control signal in 100. The monitored shift signal is input to the compensator 430.

The compensator 430 processes the monitored shift signal and outputs the processed shift signal to the bias calculator 450 in 110. For example, the monitored shift signal may be processed by high-pass filtering a shift signal, adjusting a gain of the high-pass filtered shift signal, and low-pass filtering the gain-adjusted shift signal. Here, the cut-off frequency of the shift signal, which is high-pass filtered, may be adjusted.

The bias calculator 450 calculates and outputs the bias value to be compensated for according to the shift amount of the tracking control signal, from a signal input from the compensator 430, in 130. The bias signal output from the bias calculator 450 is input to the adder 500 and is used to cancel the DC offset included in the push-pull signal generated by the push-pull signal detector 135, in 150. Accordingly, the adder 500 outputs the push-pull signal from which the DC offset is canceled, i.e., the tracking error signal normally enabling a tracking servo control, in 170. The tracking error signal from which the DC offset is removed is fed back and is used to generate the tracking control signal.

Figure 8:
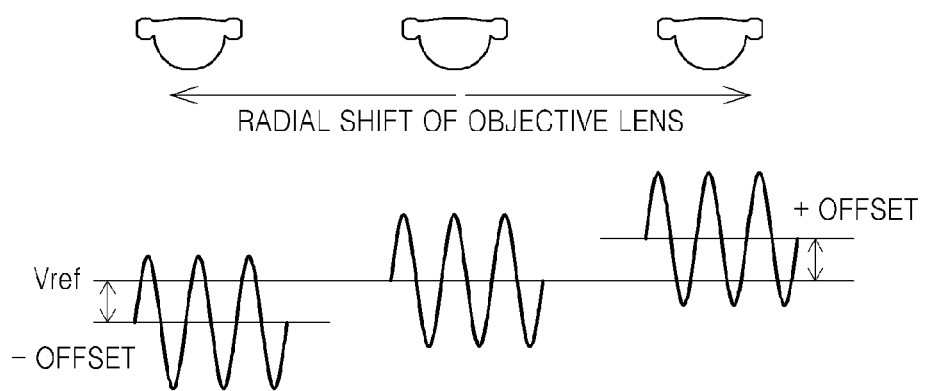
FIG. 8 is a diagram illustrating an example of a push-pull signal detected by shifting an objective lens in a radial direction.

FIG. 8 illustrates an example of a push-pull signal detected by shifting the objective lens 30 to a radial direction. As shown in FIG. 8, when the objective lens 30 is shifted, a DC offset is generated in the push-pull signal.

Figure 9:
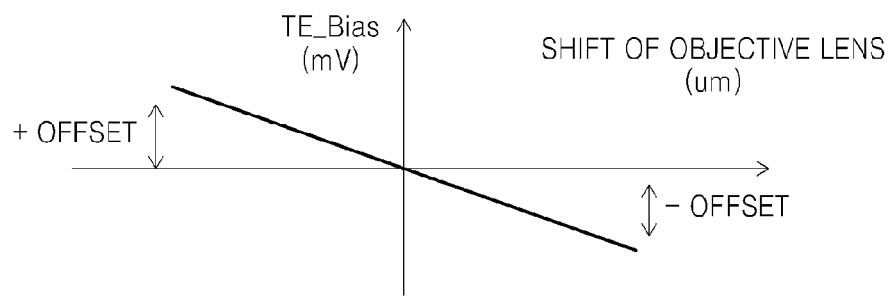
FIG. 9 is a diagram illustrating an example of a bias signal (TE bias) generated using a tracking control signal so as to cancel a direct current (DC) offset of a push-pull signal.

FIG. 9 illustrates an example of a bias signal TE_Bias generated using a tracking control signal so as to cancel a DC offset of a push-pull signal. As shown in FIG. 9, the bias signal generated by the bias generator 400 of the apparatus has a polarity that is opposite from a polarity of the DC offset shown in FIG. 8, in proportion to a shift of an objective lens.

Figure 10:
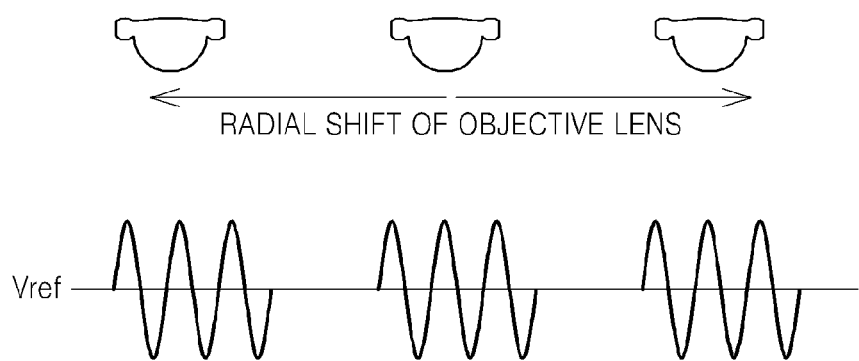
FIG. 10 is a diagram illustrating an example of a tracking error signal.

FIG. 10 illustrates an example of a push-pull signal, i.e., a tracking error signal, which is obtained by adding a bias signal to a push-pull signal.

As shown in FIG. 10, when the bias signal generated by the bias signal generator 400 is added to the push-pull signal, a push-pull signal that does not have a DC offset, i.e., a tracking error signal, may be obtained even when an objective lens is shifted.

As described herein, when a track servo control is performed using a general differential push-pull signal, an optical pickup is required to generate a side beam, thereby increasing the number of required components and production costs. According to various aspects, however, when a track servo control is performed using a single beam without a side beam, the production costs of an optical pickup are remarkably reduced and a deterioration of quality due to a side beam is prevented.

According to various aspects, a tracking servo control can be performed by cancelling an offset generated in a tracking error signal without using a side beam.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for generating a tracking error signal, the apparatus comprising:
    a tracking controller configured to generate a tracking control signal to tracking-control an optical pickup;
    a signal processor configured to generate a push-pull signal;
    a bias signal generator configured to generate a bias signal to be used to remove a direct current (DC) offset of the push-pull signal, the bias signal being generated based on a shift of the tracking control signal generated by the tracking controller and processed by a compensator of the bias signal generator, wherein the compensator comprises a high-pass filter, a gain adjustor, and a low-pass filter; and
    an adder configured to add the push-pull signal and the bias signal to generate a tracking error signal from which the DC offset is removed.

2. The apparatus of claim 1, wherein the bias signal generator comprises:
    a shift amount monitor configured to monitor a shift amount of the tracking control signal; and
    a bias calculator configured to calculate and output a bias value to be compensated for according to the shift amount of the tracking control signal.

3. The apparatus of claim 2, wherein the compensator is configured to process a shift signal monitored by the shift amount monitor and input the processed shift signal to the bias calculator.

4. The apparatus of claim 1, wherein a cut-off frequency of the high-pass filter is adjustable.

5. The apparatus of claim 1, wherein the tracking error signal output from the adder is fed back to the tracking controller.

6. An optical information storage system comprising:
    an optical pickup comprising a detector to detect light reflected from an optical information storage medium;
    a push-pull signal detector for generating a push-pull signal from a signal detected by the photodetector; and
    an apparatus for generating a tracking error signal, the apparatus comprising:
        a tracking controller configured to generate a tracking control signal to tracking-control an actuator of the optical pickup,
        a bias signal generator configured to generate a bias signal to be used to remove a direct current (DC) offset of the push-pull signal, the bias signal being generated based on a shift of the tracking control signal generated by the tracking controller and processed by a compensator of the bias signal generator, wherein the compensator comprises a high-pass filter, a gain adjustor, and a low-pass filter, and
        an adder configured to add the push-pull signal and the bias signal to generate a tracking error signal from which the DC offset is removed.

7. The optical information storage system of claim 6, wherein the bias signal generator comprises:
    a shift amount monitor configured to monitor a shift amount of the tracking control signal; and
    a bias calculator configured to calculate and output a bias value to be compensated for according to the shift amount of the tracking control signal.

8. The optical information storage system of claim 7, wherein the compensator is configured to process a shift signal monitored by the shift amount monitor and input the processed shift signal to the bias calculator.

9. The optical information storage system of claim 6, wherein a cut-off frequency of the high-pass filter is adjustable.

10. The optical information storage system of claim 6, wherein the optical pickup is configured to irradiate light emitted from a light source to the optical information storage medium in a single light form.

11. The optical information storage system of claim 10, wherein the photodetector comprises a quadrant photodetector.

12. The optical information storage system of claim 6, wherein the tracking error signal output from the adder is fed back to the tracking controller.

13. A method of generating a tracking error signal by an optical disc drive, the method comprising:
    generating a tracking control signal used for tracking-control;
    generating a push-pull signal;
    generating a bias signal to be used to remove a direct current (DC) offset of the push-pull signal, the bias signal being generated based on a shift of the generated tracking control signal generated by a tracking controller and processed by a compensator of a bias signal generator, wherein the compensator comprises a high-pass filter, a gain adjustor, and a low-pass filter; and
    adding the push-pull signal and the bias signal to generate a tracking error signal from which the DC offset is removed.

14. The method of claim 13, wherein the generating of the bias signal comprises:
    monitoring a shift amount of the tracking control signal; and
    calculating and outputting a bias value to be compensated for according to the shift amount of the tracking control signal.

15. The method of claim 14, further comprising processing, by the compensator, a monitored shift signal.

16. The method of claim 15, wherein the processing of the monitored shift signal comprises:
    high-pass filtering the monitored shift signal;
    adjusting a gain of the high-pass filtered shift signal; and
    low-pass filtering the gain-adjusted shift signal.

17. The method of claim 16, wherein a cut-off frequency of the shift signal that is high-pass filtered is adjustable.

18. The method of claim 13, wherein the tracking error signal from which the DC offset is canceled is fed back to be used to generate the tracking control signal.

* * * * *